United States Patent [19]

Norimatsu et al.

[11] Patent Number: 5,730,010
[45] Date of Patent: Mar. 24, 1998

[54] MOUNTING STRUCTURE OF KEY LOCK UNIT

[75] Inventors: Naoki Norimatsu, Isehara; Yasunari Mita, Tokyo, both of Japan

[73] Assignee: Nissan Motor Co., Ltd., Yokohama, Japan

[21] Appl. No.: 652,134

[22] Filed: May 23, 1996

[30] Foreign Application Priority Data

May 30, 1995 [JP] Japan .................... 7-131939

[51] Int. Cl.⁶ .................................... B60R 25/02
[52] U.S. Cl. ................. 70/186; 70/252; 70/422; 74/492
[58] Field of Search ............. 70/252, 253, 182–186, 70/237, 422; 74/492

[56] References Cited

U.S. PATENT DOCUMENTS

| 1,329,391 | 2/1920 | Folster | 70/185 |
| 2,890,581 | 6/1959 | Lewis | 70/252 |
| 4,854,142 | 8/1989 | Peitsmeier et al. | 70/237 X |

FOREIGN PATENT DOCUMENTS

| 0365423 | 4/1990 | European Pat. Off. | 70/182 |
| 2194203 | 3/1988 | United Kingdom | 70/252 |

*Primary Examiner*—Lloyd A. Gall
*Attorney, Agent, or Firm*—Foley & Lardner

[57] ABSTRACT

In a mounting structure of a key lock unit comprising a key lock unit having a locking rod whose end engages and disengages with a lock recess portion formed in a steering shaft in a column tube, and a rod housing which slidably provides the locking rod therein, a boss portion provided on the end of the rod housing being fitted into a penetrating mounting hole of the column tube, and a key lock bracket that receives and supports the end of the key lock unit being welded to the column tube, according to the present invention, a patch bracket having a through hole with a size corresponding to the mounting hole, and disposed in overlap with the outer surface of the column tube, matching the through hole with the mounting hole, and further welded to the key lock bracket, is provided, a through hole-shaped gap is provided between the key lock bracket and the column tube, and a detecting protrusion which fits into the through hole-shaped gap is provided.

4 Claims, 5 Drawing Sheets

MOUNTING STRUCTURE OF KEY LOCK UNIT

BACKGROUND OF THE INVENTION

1. Field of the Invention

The present invention relates to a mounting structure of a key lock unit which is mounted on a steering column and is used in a steering lock device of an automobile or the like.

2. Description of Related Art

As a conventional mounting structure of a key lock unit, there is known a structure shown in FIG. 1, for example, (see Japanese Unexamined Patent Publication (Kokai) No. Hei.5-032151).

As shown in FIG. 1, a key lock unit 1 includes a locking rod 3 and a rod housing 5. The locking rod 3 is slidably provided in the rod housing 5, and an end of the locking rod 3 is engaged with a lock recess portion 9 formed in a steering shaft 7. The lock recess portion 9 is formed by a key lock collar 11 welded to the steering shaft 7. The locking rod 3 is linked to a key cylinder 15 through a lock release mechanism 13. A boss portion 17 is provided on the end portion of the lock housing 5, and the boss portion 17 is fitted to a mounting hole 21 penetrated to a column tube 19.

FIG. 2 shows a schematic cross-sectional view of the mounting state of the key lock unit 1 as taken along the section in a direction perpendicular to the axis of the steering shaft 7.

In thus formed structure, the locking rod 3 is slid on the rod housing 5 and is engaged with or disengaged from the lock recess portion 9 by the operation of the key cylinder 15, thereby being locked or unlocked.

However, in the above-mentioned structure, when the steering wheel is rotated by a big force under a lock condition and an excess torque is input into the steering shaft 7, a bending force is acted on the locking rod 3. As the result, an overload is affected between the boss portion 17 and the mounting hole 21. To prevent the boss portion 17 from falling away from the mounting hole 21, it is necessary to lengthen the fit length of the boss portion 17 and the mounting hole 21 as long as possible, by increasing the wall thickness of the column tube 19, or by increasing the degree of protrusion of the boss portion 17.

However, when the wall thickness of the column tube 19 is increased by increasing the outer diameter thereof while keeping the inner diameter thereof constant, there arises a problem that the steering column itself becomes large. On the other hand, when the wall thickness of the column tube 19 is increased by decreasing the inner diameter thereof while keeping the outer diameter thereof constant, inconvenience tends to occur at collapse. That is, the column tube 19 consists of an inner tube and an outer tube, and a load absorption structure is provided between these inner tube and outer tube. Further, when a load of the occupant is affected on the steering wheel at a collision between vehicles, the inner tube is fitted into the outer tube and at the same time, load absorption is carried out. Thus, when the inner diameter of the outer tube is decreased, the inner tube has a small diameter on the whole and the inner tube tends to interfere on the key lock collar 11 at the time of collapse.

Further, as another method of increasing the fitting strength between the boss portion 17 and the mounting hole 21, it is considered to improve the rigidity of the column tube 19 by changing the material thereof. Nevertheless, in this case, the workability of the column tube tends to be deteriorated and setting of a load of a collapse becomes difficult. Alternatively, although it is also conceived to increase the fit length to the mounting hole 21 by increasing the degree of protrusion of the boss portion 17, the degree of protrusion of the boss portion 17 into the column tube is increased, and then, the inner tube tends to interfere with the boss portion 17 due to variability of products, at the time of collapse.

SUMMARY OF THE INVENTION

With these problems in mind, therefore, it is the object of the present invention to provide a mounting structure of a key lock unit that can increase the mounting strength without changing the wall thickness and material of the column tube itself, and can improve detectability of collapse.

To achieve the above-described object, the present invention provides a mounting structure of a key lock unit comprising a key lock unit having a locking rod whose end engages and disengages with a lock recess portion formed in a steering shaft in a column tube, and a rod housing which slidably provides said locking rod therein, a boss portion provided on the end of said rod housing being fitted into a penetrating mounting hole of said column tube, and a key lock bracket that receives and supports the end of said key lock unit being welded to said column tube, wherein a patch bracket having a through hole with a size corresponding to said mounting hole, and disposed in overlap with the outer surface of said column tube, matching said through hole with said mounting hole, and further welded to said key lock bracket, is provided, a through hole-shaped gap is provided between said key lock bracket and said column tube, and a detecting protrusion which fits into said through hole-shaped gap is provided.

It is preferable in the mounting structure of the key lock unit according to the present invention that a pair of said gaps are provided on said key lock bracket and said detecting protrusion is protruded on both sides of said patch bracket so that it is fitted into said respective gaps.

It is also preferable in the mounting structure of the key lock unit according to the present invention that said through hole of said patch bracket is formed to be smaller than said mounting hole.

According to the present invention, the through hole of the patch bracket can be formed in a shape extended on the outer surface side of the column tube, by use of a mounting hole for the patch bracket, overlapped on the outer surface of the column tube. Therefore, the fitting length between the key lock unit and the boss portion can be increased. Further, when an overload is acted on the key lock unit by the action of an excessive torque on the steering shaft from the steering wheel, or the like, the detecting protrusion is moved in the gap between the key lock bracket and the column tube, by falling away of the patch bracket, whereby noise for detection can be generated. Additionally, since the patch bracket is welded to the key lock bracket, the thermal influence on the column tube at welding can be suppressed.

Further, according to the present invention, a detecting protrusion protruded on both sides of the patch bracket is fitted into gaps on both sides of the key lock bracket. Accordingly, separation of the patch bracket from the column tube can be prevented by the gaps at falling away of the patch bracket.

Further, according to the present invention, when overload is acted on the key lock unit, a load can be directly input into the patch bracket through a through hole. Accordingly, the patch bracket can positively fall away from the key lock bracket to increase a detectability.

BRIEF DESCRIPTION OF DRAWINGS

The present invention will be described more fully in connection with the accompanying drawings in which.

DESCRIPTION OF THE PREFERRED EMBODIMENTS

Figure 1:
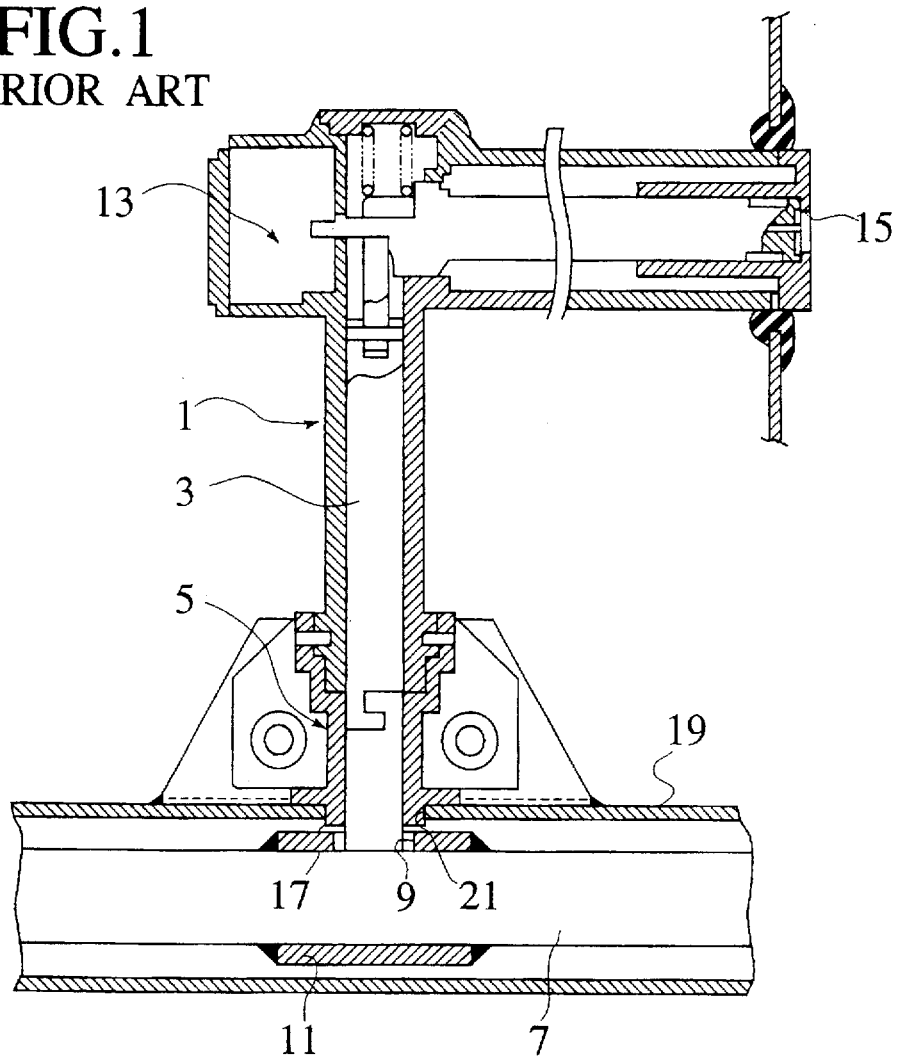
FIG. 1 is a cross-sectional view of a main portion of a conventional mounting structure of a key lock unit.
Figure 2:
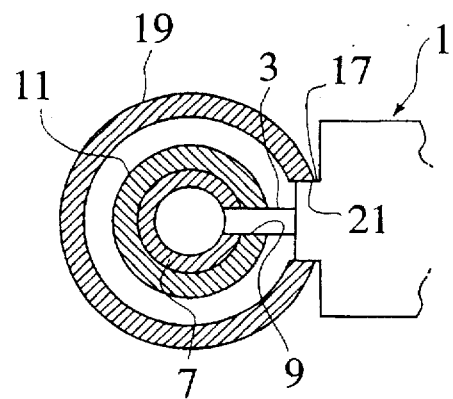
FIG. 2 is a schematic cross-sectional view as taken along a section line in a direction perpendicular to the axis of a steering shaft shown in FIG. 1.

An embodiment of a mounting structure of a key lock unit according to the present invention will now be described, with reference accompanying drawings hereinbelow. In the drawings according to the present invention, the same components as in FIGS. 1 and 2 will be denoted by the same reference numerals as therein and overlapped explanations will be omitted.

Figure 3:
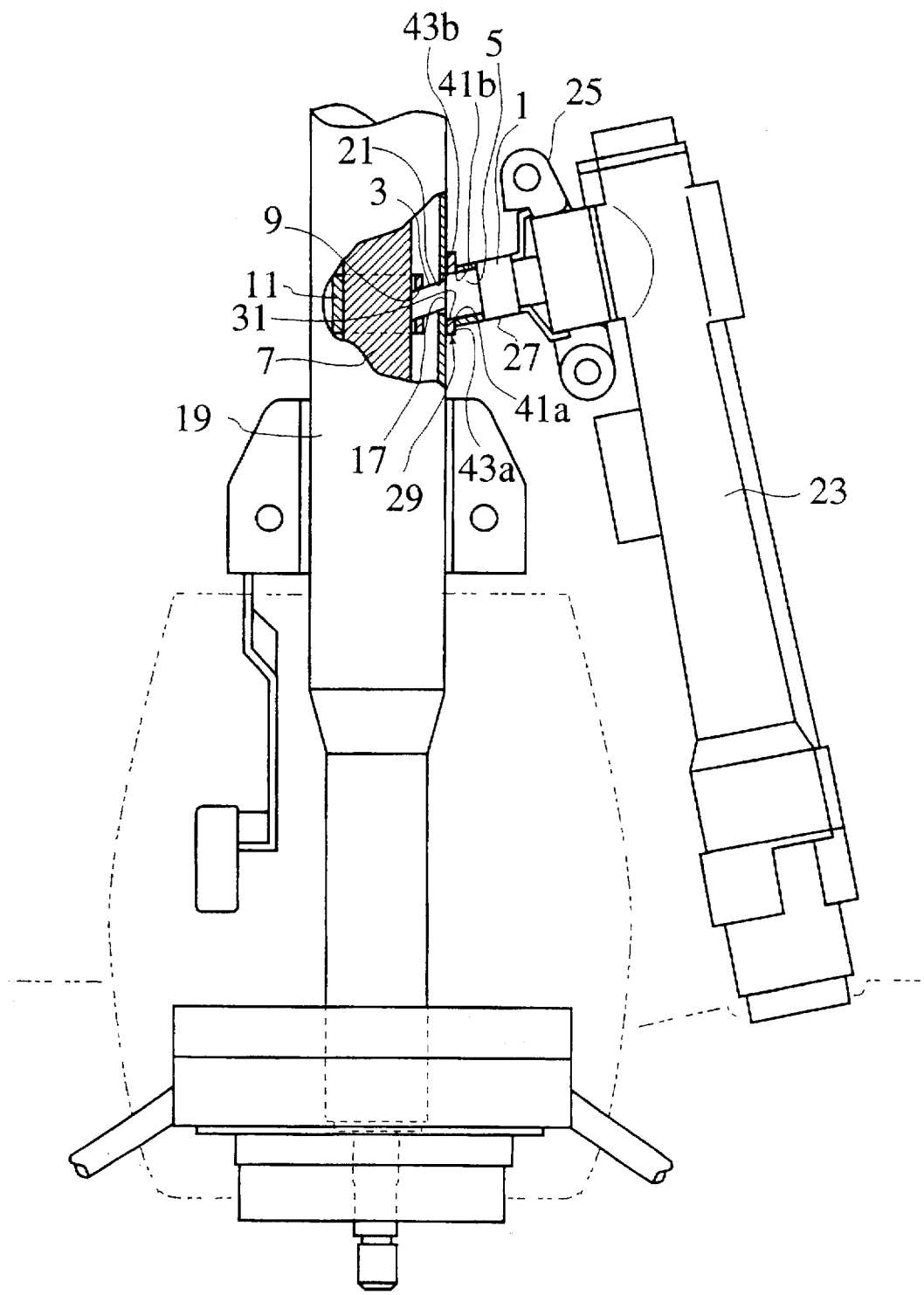
FIG. 3 is a partially cutout plan view of a mounting structure of a key lock unit according to an embodiment of the present invention.

FIG. 3 shows a partially cut off plan view of a steering device to which a mounting structure of a key lock unit according to an embodiment of the present invention was applied. In the embodiment, a rod housing 5 of a key lock unit 1 is rotatably connected to a frame 23. A lock release mechanism is incorporated in the frame 23 and a key cylinder 15 is mounted on one end of the frame 23. The rod housing 5 is provided with a hanger 25 extending therefrom, and fastened and fixed to the key lock bracket 27. A key lock bracket 27 receives an end portion of the key lock unit 1 to support it. The patch bracket 29 is disposed on an outer surface of a column tube 19 so that it is overlapped thereon, and is attached to the key lock bracket 27 by welding.

Figure 4:
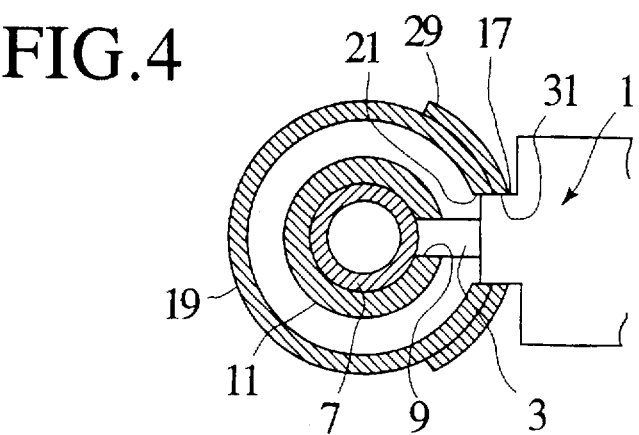
FIG. 4 is a schematic cross-sectional view as taken along a section line in a direction perpendicular to the axis of a steering shaft shown in FIG. 8.

FIG. 4 is a schematic cross-sectional view showing the relationship between the key lock unit 1 and the patch bracket 29, as taken along a section line in a direction perpendicular to the axis of the steering shaft 7. As shown in FIG. 4, a through hole 31 with a size corresponding to the size of a mounting hole 21 of the column tube 19, is provided in the patch bracket 29. The patch bracket 29 is attached to the column tube 19 in such a manner that the through hole 31 of the patch bracket 29 is matched to the mounting hole 21 of the column tube 19. Therefore, the through hole 31 of the patch bracket 29 forms a hole extended from the mounting hole 21 of the column tube 19 to the outer side thereof.

By the formation of a hole extended from the mounting hole 21 by the through hole 31, a boss portion 17 of the key lock unit 1 is also formed in such a manner that it is slightly extended to the outer side of the column tube 19. Thus, the fitting length of the boss portion 17 to the mounting hole 21 and the through hole 31 can be increased.

The detailed structure of each portion will be described in connection with FIGS. 5 to 8 hereinbelow.

Figure 5:
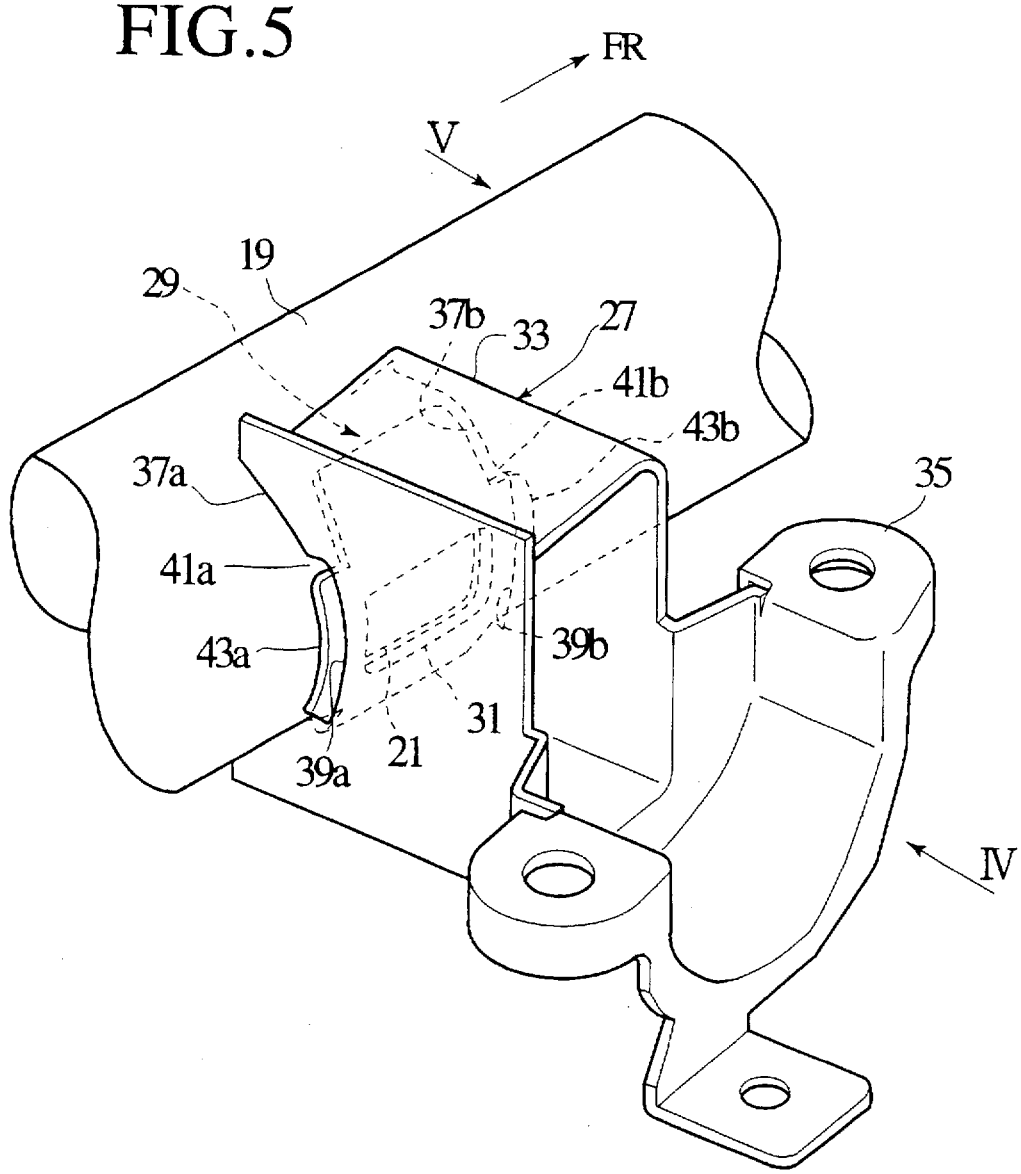
FIG. 5 is an enlarged perspective view of a main portion according to an embodiment of the present invention.
Figure 6:
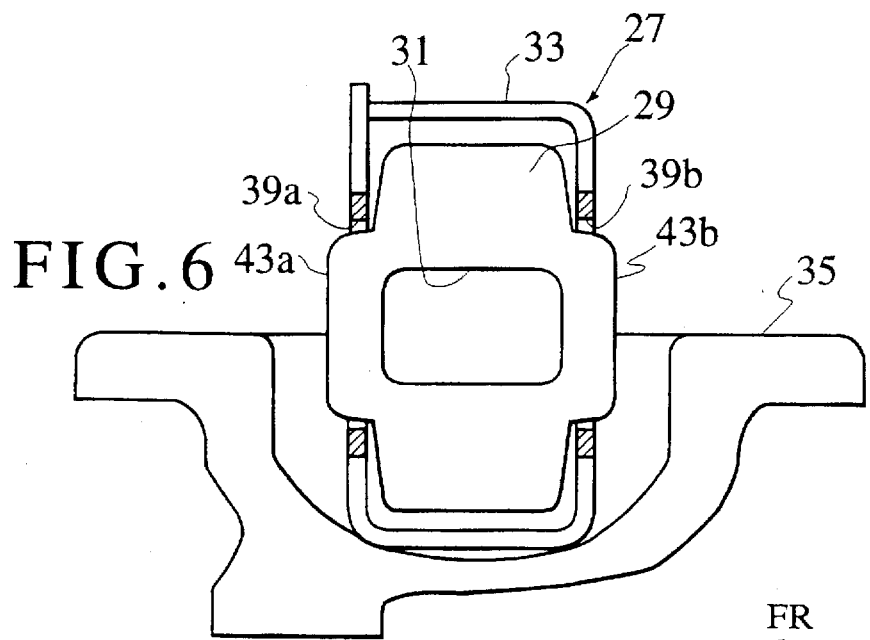
FIG. 6 is a view as seen along view line IV of FIG. 5.
Figure 7:
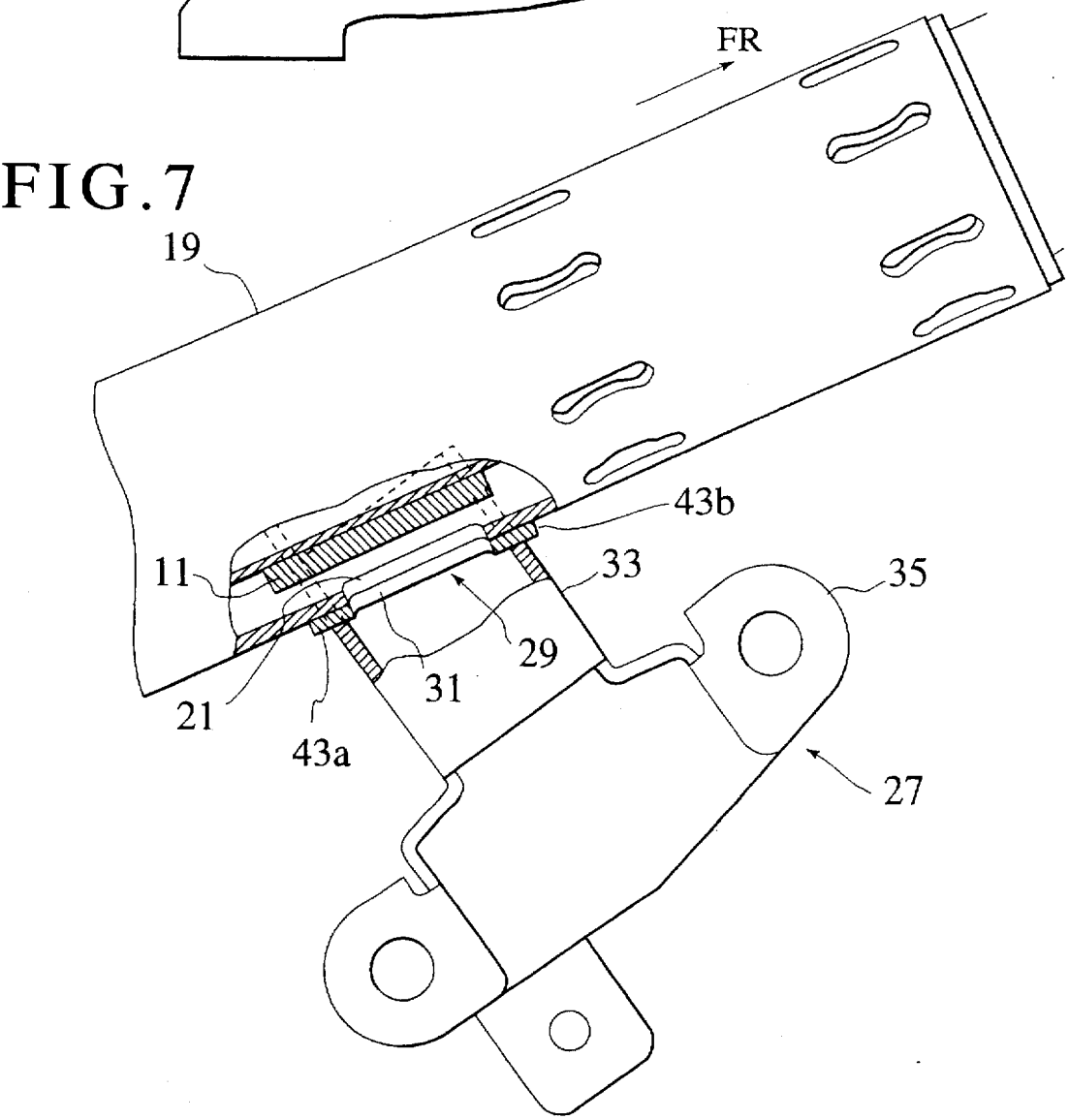
FIG. 7 is a view as seen along view line V of FIG. 5.
Figure 8:
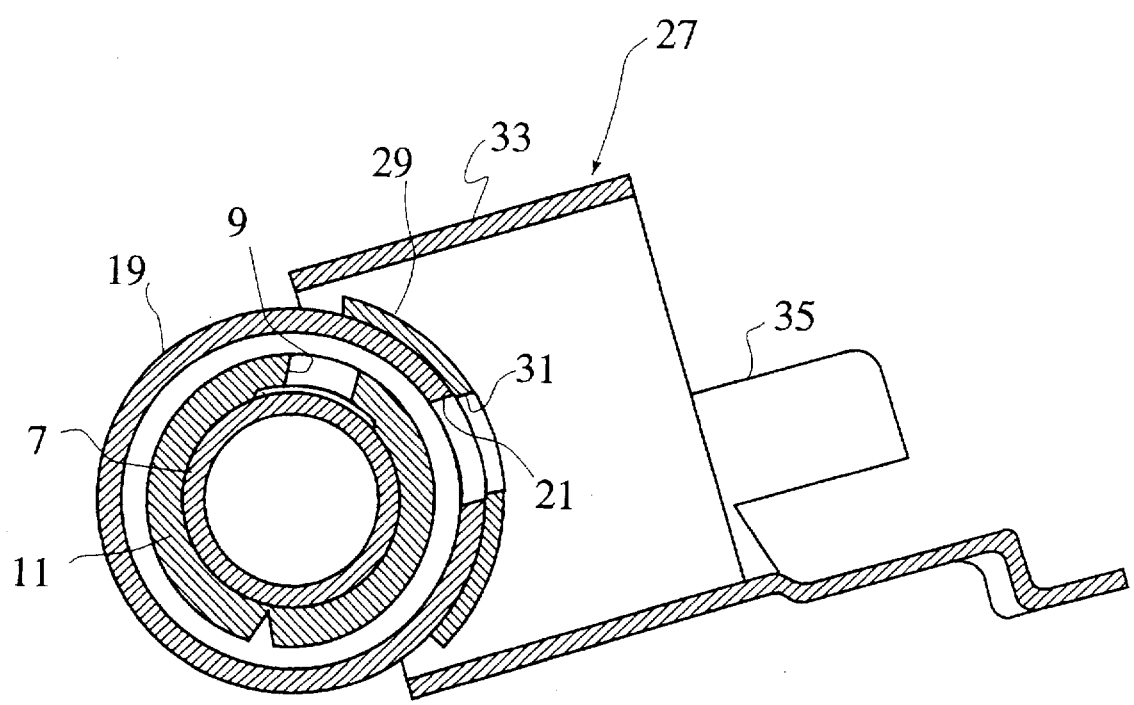
FIG. 8 is a schematic cross-sectional view as taken along a section line in a direction perpendicular to the axis of a steering shaft, according to an embodiment of the present invention.

FIG. 5 is a perspective view of a patch bracket 29 with a key lock bracket 27, the key lock unit being removed, as seen from the side of the key lock bracket 27. The front side (FR) of a car body is the right upper side of FIG. 5. FIG. 6 is a view as seen along view line IV of FIG. 5, FIG. 7 is a view as seen along view line V of FIG. 5, and FIG. 8 is a schematic cross-sectional view as taken along a section line in a direction perpendicular to the axis of a steering shaft, according to an embodiment of the present inventions.

As shown in FIGS. 5 to 8, the key lock bracket 27 consists of a unit supporting portion 33 and a unit joint portion 35. In the unit supporting portion 33 is received and supported an end of the key lock unit (not shown), and to the unit portion 35 is joined a hanger of the key lock unit. Both end edges 37a and 37b of the unit supporting portion 33 are formed in circular arc shapes which are along the outer surface of the column tube 19, and the edges 37a and 37b of the unit supporting portion 33 are attached to the column tube 19 by a butt welding. Cutout recess portions 39a and 39b are formed in the respective middle portions of the end edges 37a and 37b of the unit supporting portion 33. Thus formed recess portions 39a and 39b of the key lock bracket 27 provide through hole shaped gaps 41a and 41b between the key lock bracket 27 and the column tube 19. That is, the gaps 41a and 41b form such a structure that they are provided on both sides of the key lock bracket 27 by one pair in the axial direction of the column tube.

The patch bracket 29 is formed in a arcuate shape along the outer surface of the column tube 19, and detecting protrusions 43a and 43b are provided on both sides of the patch bracket 29 in the axial direction of the column tube 19, whereby the entire shape is formed to be a cross. The detecting protrusions 43a and 43b are fitted into the gaps 41a and 41b and are attached to the key lock bracket 27 in the gaps 41a and 41b by welding. In the embodiment, the size of the through hole 31 is formed so as to be a little smaller than that of the mounting hole 21. The entire width of the patch bracket 29 is formed so as to be a little smaller than the width between the internal surfaces of the unit supporting portion 33 of the key lock bracket 27, and the entire height of the patch bracket 29 is formed so as to be a little smaller than the height of the unit supporting portion 33, and is formed so as to be larger than the respective vertical length of the gaps 41a and 41b. The respective vertical length of the detecting protrusion 43a and 43b are a little shorter than those of the gaps 41a and 41b.

The operation of the mounting structure of the key lock unit according to the embodiment will now be described.

According to the structure of the embodiment explained above, the patch bracket 29 is attached to the column tube 19, the mounting hole 21 of the column tube is extended to the outer side of the column tube 19 by forming the through hole 31. Also, the length of the boss portion 17 is extended to the outer side of the column tube 19. Thus, the fitting length of the boss portion 17 to the mounting hole 21 and the through hole 31 is increased, with result that the mounting strength of the key lock unit 1 can be sufficiently enhanced. Further, since the wall thickness and the material of the column tube 19 itself are not changed, the steering column itself is not enlarged, and the structure of the increased fitting length does not affect collapse characteristics. Furthermore, since the boss portion 17 is extended to the outer side of the column tube 19, it does not also affect the collapse characteristics.

When an excessive torque is then acted on the steering shaft 7 from the steering wheel, an overload is acted on the fitting portion of the boss portion 17 to the mounting hole 21 and the through hole 31 through the locking rod 3. The weld portion of the patch bracket 29 to the key lock bracket 27 is broken by the overload, and the patch bracket 29 falls away from the key lock bracket 27. Particularly, in the embodiment, since the through hole 31 is formed in a size a little smaller than in the mounting hole 21, when an overload is acted on the key lock unit 1, the load is positively given to the patch bracket 29. Therefore, only the patch bracket 29 can easily fall away from the key lock bracket 27.

In this way, when the patch bracket 29 falls away from the key lock bracket 27 in a state where the key lock bracket remains on the column tube 19, the detecting protrusions 43a and 43b of the patch bracket 29 are moved within the gaps 41a and 41b, and hit on the outer surface of the column tube 19 and the key lock bracket 27, thereby generating a noise to be detected. As the result the breakage of the mounting of the key lock unit 1 can easily be detected, and a detectability can be enhanced. Since the patch bracket 29 has detecting protrusions 43a and 43b on both sides thereof so as to form a cross, even if the patch bracket 29 falls away from the key lock bracket 27, the detecting protrusions 43a and 43b are supported within the gaps 41a and 41b, whereby the patch bracket is not separated from the key lock bracket 27. Therefore, the patch bracket 29 can generate a noise to be detected until a repair is carried out, and detecting characteristics can be enhanced to a large extent.

The patch bracket 29 is welded to the key lock bracket 27 side. An element which is welded to the column tube 19 side is only the key lock bracket 27. Accordingly, the weld length for the column tube 19 can be shortened, an effect on the column tube 19 due to heat in welding can be suppressed to a large extent. Thus, the influence on the collapse characteristics can be suppressed.

As explained above, according to the present invention, the fitting length of the boss portion to the mounting hole side of the column tube can be increased. Consequently, a mounting strength of the key lock unit can be increased. Further, when an overload is acted on the key lock unit, the patch bracket falls away from the key lock bracket while generating a noise, whereby a detection of the breakage can easily be carried out. Furthermore, since the patch bracket is welded to the key lock bracket side, an effect of the welding heat on the column tube can be reduced, and the influences on the collapse characteristics can also be suppressed.

Further, according to the present invention, when the patch bracket falls away from the key lock bracket, both detecting protrusions of the patch bracket can be supported by both recess portions of the key lock bracket. Thus, the separation of the patch bracket from the column tube can be prevented, whereby a detectability can further positively be enhanced.

Furthermore, according to the present invention, when an overload is acted on the key lock unit, the patch bracket can positively fall away from the key lock bracket, whereby a detectability can further positively be enhanced.

It will be appreciated that the present invention is not restricted to the particular embodiment that has been described, and that variations may be made therein without departing from the scope of the invention as defined in the appended claims and equivalents thereof.

What is claimed is:

1. A mounting structure of a key lock unit comprising: a key lock unit having a locking rod whose end engages and disengages with a lock recess portion formed in a steering shaft in a column tube, and a rod housing which slidably provides said locking rod therein, a boss portion provided on an end of said rod housing being fitted into a penetrating mounting hole of said column tube, and a key lock bracket that receives and supports an end of said key lock unit being welded to said column tube, wherein a patch bracket having a through hole with a size corresponding to said mounting hole, and disposed in overlap with the outer surface of said column tube, matching said through hole with said mounting hole, and further welded to said key lock bracket, is provided, a through hole-shaped gap is provided between said key lock bracket and said column tube, and a detecting protrusion which fits into said through hole-shaped gap is provided.

2. A mounting structure of a key lock unit according to claim 1, wherein a pair of said gaps are provided on said key lock bracket and said detecting protrusion is protruded on both sides of said patch bracket so that it is fitted into said respective gaps.

3. A mounting structure of a key lock unit according to claim 1, wherein said through hole of said patch bracket is formed to be smaller than said mounting hole.

4. A mounting structure of a key lock unit according to claim 2, wherein said through hole of said patch bracket is formed to be smaller than said mounting hole.

* * * * *